Figure 1:
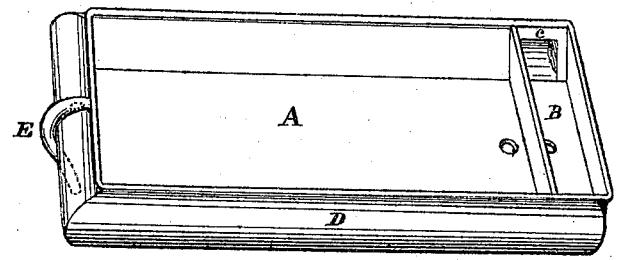

H. BLAKE.

Improvement in Milk-Coolers.

No. 131,993.    Patented Oct. 8, 1872.

Witnesses:
Wm Colborne Brookes
Geo. N. Howard

Harry Blake, Inventor.
C S Whitman Attorney.

UNITED STATES PATENT OFFICE.

HARRY BLAKE, OF PANAMA, NEW YORK.

IMPROVEMENT IN MILK-COOLERS.

Specification forming part of Letters Patent No. 131,993, dated October 8, 1872.

*To all whom it may concern:*

Be it known that I, HARRY BLAKE, of Panama, in the county of Chautauqua, in the State of New York, have invented an Improved Milk Pan and Cooler; and do hereby declare that the following description, taken in connection with the accompanying drawing hereinafter referred to, forms a full and exact specification of the same, wherein I have set forth the nature of my said improvements, by which my invention may be distinguished from others of a similar class, together with such parts as I claim and desire to secure by Letters Patent.

My invention relates to that class of dairy implements known as milk-cooling pans; and the nature thereof consists in certain modifications in the details of the construction of the same, hereinafter described and shown.

In the accompanying plate of drawing, which illustrates my invention and forms a part of the specification thereof, Figure 1 is a view in perspective.

The construction, operation, and relative arrangement of the component parts of my invention are as follows:

In the drawing, letter A designates the compartment containing milk, and B a compartment into which water is introduced. The compartment B communicates, by means of openings c, with the exterior semicylindrical rim D, which is provided with an exit-pipe, E, attached to the top thereof for the purpose of conveying away warm water which rises to the top of the rim.

Having thus described the construction and operation of my invention, I will indicate in the following clause what I claim and desire to secure by Letters Patent of the United States—that is to say:

A milk-cooling can, consisting, essentially, of the milk and water reservoirs and exterior flange provided with an exit-pipe, all combined and operating together as described.

In witness whereof I have subscribed my name hereto this 7th day of February, 1872.

HARRY BLAKE.

Witnesses:
    THADDEUS F. RANDOLPH,
    F. G. STEWARD.